B. HUBER.
Improvement in Printing Presses.
No. 124,822. Patented March 19, 1872.

Witnesses:
A. W. Almqvist
Francis McArdle

Inventor:
Berthold Huber
per Munn & Co
Attorneys.

UNITED STATES PATENT OFFICE.

BERTHOLD HUBER, OF WILLIAMSBURG, NEW YORK.

IMPROVEMENT IN PRINTING-PRESSES.

Specification forming part of Letters Patent No. 124,822, dated March 19, 1872.

CASE A.

*To all whom it may concern:*

Be it known that I, BERTHOLD HUBER, of Williamsburg, in the county of Kings and State of New York, have invented a new and useful Improvement in Movement for Printing-Presses; and I do hereby declare that the following is a full, clear, and exact description thereof, which will enable others skilled in the art to make and use the same, reference being had to the accompanying drawing forming part of this specification.

Figure 1:
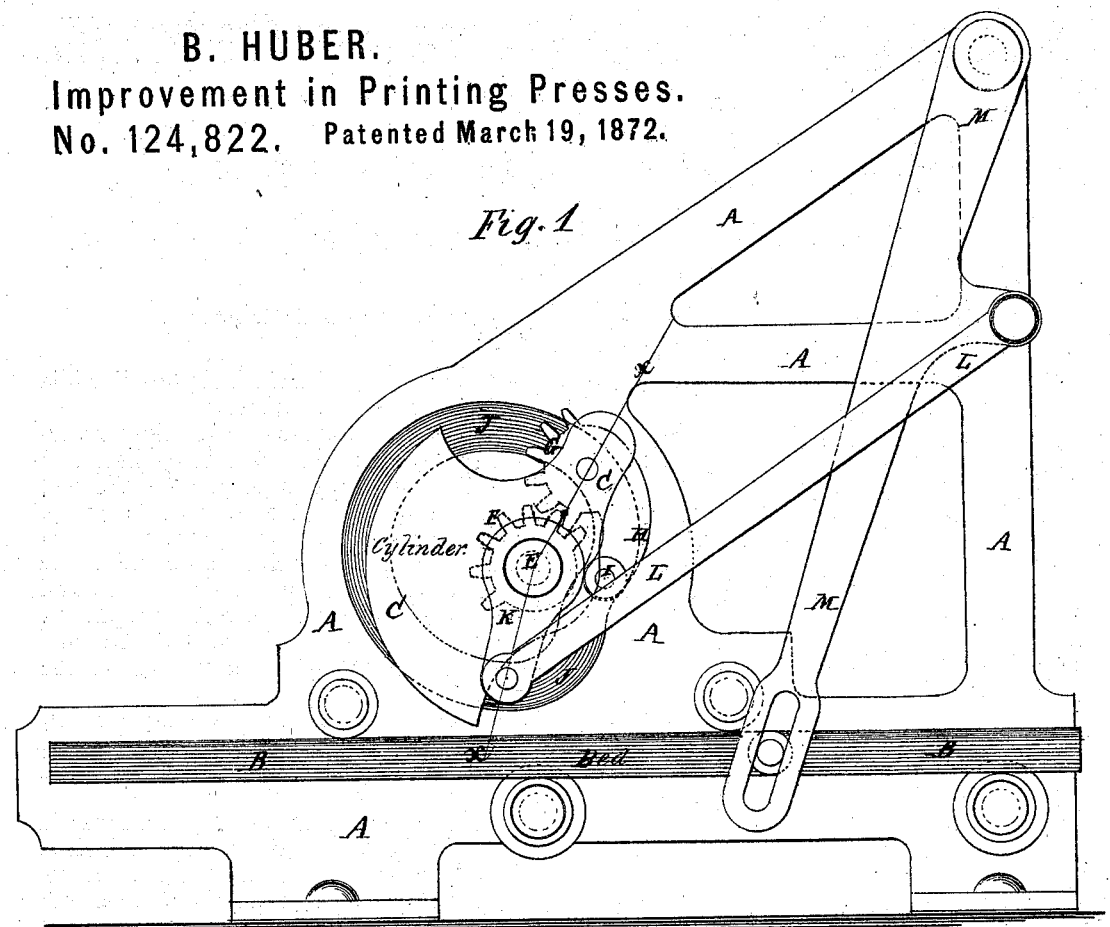
Figure 2:
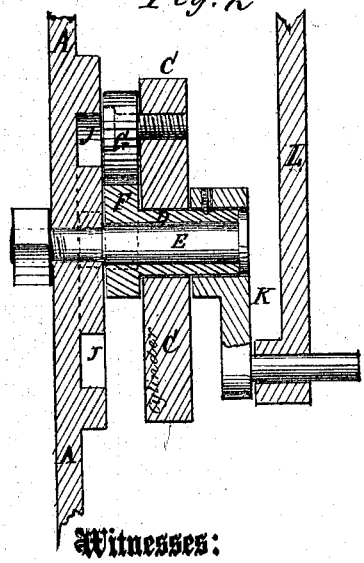
Figure 3:
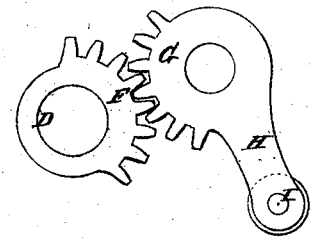

Figure 1 is a detail view illustrating my improved movement. Fig. 2 is a detail sectional view of the same taken through the line $x$ $x$, Fig. 1. Fig. 3 is a detail view of the segmental gear-wheels by which the movement of the cylinder is controlled.

My invention has for its object to furnish an improved movement for printing-presses by which the cylinder will be made to move at the exact rate of speed with the bed-plate, while in contact with the said bed-plate, and allowed to move at a different rate of speed during the rest of its revolution, to bring it again in contact with the bed-plate at the proper time, thus allowing the cylinder to be made smaller than it can be made when the ordinary movement is used; and it consists in the construction of various parts of the movement, as hereinafter more fully described.

A represents the frame-work of the press. B is the sliding bed-plate, and C is the cylinder. The cylinder C is placed upon a sleeve, D, through which passes the shaft E, upon which the said cylinder revolves. Upon the sleeve D is formed a segment of a gear-wheel, F, the teeth of which mesh into the teeth of a segmental gear-wheel, G, which is pivoted to the cylinder C, and upon which is solidly formed an arm, H, having a pin, I, provided with a friction-pulley attached to or formed upon its outer end. The pin I enters a groove, J, formed in a plate attached to the frame-work A.

If the groove J was made a true circle and concentric with the cylinder C, the said cylinder would be carried at a uniform rate through its entire revolution by the segmental gear-wheels F G, arm H, and pin I. By making the groove J eccentric, and with a re-entrant part, as shown in Fig. 1, the rate of motion may be so regulated that the cylinder C will revolve at different rates, so as to always move at the same velocity with the bed-plate B, while in contact with said bed-plate.

To the sleeve D is attached a crank or crank-pulley, K, to which the power is applied, and to the crank-pin of which is pivoted the end of a connecting-bar, L, the other end of which is pivoted to the bar or lever M, or to an arm attached to said lever. The upper end of the lever M is pivoted to the frame-work A, and its lower part is slotted to receive a pin, attached to the bed-plate B, so that the bed-plate may be moved by the oscillations of the said lever.

The crank K that drives the bed-plate may be attached to an independent shaft, if desired, instead of driving the cylinder and bed-plate from the same driving-pulley.

The form and arrangement of the lever M and bar L may be varied, as may be desired or convenient—as for instance, instead of being slotted the said lever may be toothed and may gear into a gear-wheel that drives said bed-plate—or the bar L may be slotted to receive the crank-pin of the crank-pulley or crank-arm K. In this case the lever M should be rigidly attached to the bar L, and would have a vertical movement, its rack-teeth working into the teeth of the pinion-wheel that drives the bed-plate; or the said bars or levers may be modified in other ways.

It should be observed that this invention is only applicable to those presses in which the bed-plate is driven by a crank movement.

Having thus described my invention, I claim as new and desire to secure by Letters Patent—

1. The sleeve D, segmental gear-wheel F, segmental gear-wheel G, arm H, guide-pin I, and eccentric groove J in combination with the cylinder C, shaft E, and crank-pulley or arm K, substantially as herein shown and described, and for the purpose set forth.

2. The combination of the bars or levers L M with the crank-pulley or arm K, sleeve D, segmental gear-wheel F, segmental gear-wheel G, arm H, guide-pin I, eccentric groove J, cylinder C, and shaft E, substantially as herein shown and described, and for the purpose set forth.

BERTHOLD HUBER.

Witnessess:
 JAMES T. GRAHAM,
 T. B. MOSHER.